Oct. 22, 1963   J. A. DANIELS   3,107,619
NOSE DRIVEN RE-ENTRY PISTON AND COMPRESSION CHAMBER
Filed Oct. 19, 1961
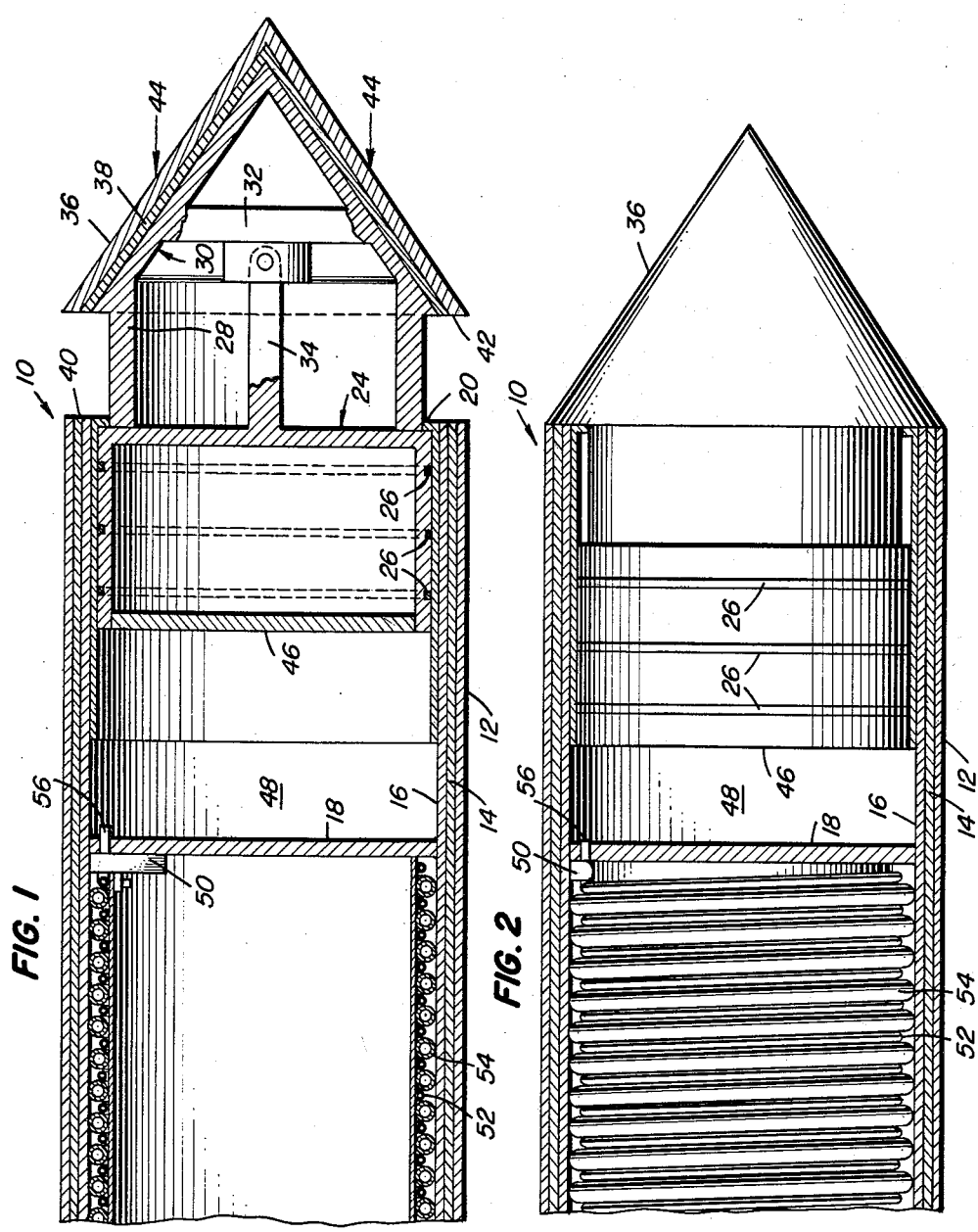
INVENTOR
James A. Daniels
BY
ATTORNEY

United States Patent Office 3,107,619
Patented Oct. 22, 1963

3,107,619
NOSE DRIVEN RE-ENTRY PISTON AND
COMPRESSION CHAMBER
James A. Daniels, 1252 Riverside Ave., Somerset, Mass.
Filed Oct. 19, 1961, Ser. No. 146,128
5 Claims. (Cl. 102—92.5)

This invention relates to a nose driven re-entry piston and compression chamber and has for an object to provide a means particularly useful on aircraft or space craft for maintaining a supply of compressed fluid under compression until it is needed, either for power purposes or for cooling purposes, and for maintaining compression on the fluid while part of the fluid is being conducted therefrom for its intended use.

Still a further object of this invention is to provide a compression containing chamber wherein fluid can be stored under pressure until needed, on aircraft or space craft, and wherein a nose driven piston, driven by the pressure of the atmosphere as the aircraft passes through the atmosphere, or as the space craft enters the atmosphere, to continue to maintain compression on the fluid as part of the fluid is conducted away from the source of supply, thereby preventing a drop in the pressure of the fluid, so as to maintain the use of the fluid at the maximum efficiency.

Still a further object of this invention is to provide a piston and compression chamber which may be used under water as on a water borne or submarine vehicle, or wherever a suitable external pressure exists on the outer shell of a vehicle.

Still a further object of this invention is to provide a piston movable within a cylindrical wall by pressure created by the atmosphere on a nose mounted on the piston so as to provide or maintain a pressure on the driven side of the piston within the cylinder wall.

With the above and related objects in view, this invention consists in the details of construction and combination of parts as will be more fully understood from the following description, when read in conjunction with the accompanying drawings in which:

FIG. 1 is a longitudinal section taken substantially axially through the device of this invention, showing the piston at its upper limit of movement.

FIG. 2 is a partly sectional and partly elevational view of the device, showing the piston at its bottom limit of movement.

There is shown at 10 the nose driven re-entry piston and compression chamber device of this invention. This device 10 includes a cylindrical wall 12 which, as here shown, may have two concentric inner sleeves 14 and 16 in order to reinforce the outer wall 12 and provide great mechanical strength thereto. Extending diametrically of the axis of the cylindrical wall 12 is a floor 18.

Located at the upper end of the sleeve 16 of the cylindrical wall 12 is a flanged lip 20 extending internally somewhat from a short lining sleeve 22 in contact with the upper end of the inner cylindrical wall lining sleeve 16. The wall 12, the lining sleeves 14 and 16 and the short lining sleeve 22 may all be secured together in any suitable well-known manner for providing a tight bond therebetween, such as welding, spot welding, or any other conventional manner, the bottom floor 18 being similarly suitably secured in position.

Movable within the short lining sleeve 22 is a piston 24 having a plurality of piston rings 26 between its outer cylindrical surface and the inner surface of the cylinder lining sleeve 22 to provide a pressure type fit therein.

At the upper end of piston 24, there is provided a supporting annular wall 28 on which rests a nose cone 30, the nose cone 30 having a transverse brace 32 secured thereto and secured to a center supporting stem 34 extending axially from the top of the piston 24. In order to provide extreme mechanical strength, the nose cone 30 likewise has several complementary walls in the form of a nose cone outer cap 36 and an intermediate nose cone bonding wall 38. Nose cone 30 projects over the upper end 40 of the cylindrical wall 12, as shown at 42, while the diameter of the annular wall 28 is substantially equal to the internal diameter of the flanged lip 20. As a result, the nose cone 30, when subjected to pressure as shown by arrows 44, may travel in the cylindrical wall 12 and particularly in the short lining sleeve 22 downwardly in the direction of the floor 18 until the projection 42 abuts the cylinder wall end 40.

The bottom 46 of the piston 24, the very top of the floor 18 and the insides of the lining sleeves 22 and 16 of the cylindrical wall 12 provide a chamber 48. Extending through the floor 18 and through a flow control box 50 are a small diameter conduit 52 and a large diameter conduit 54. Conventional valve details not specifically shown herein are provided in the control box 50 so that compressed fluid which has been stored within the chamber 48 may flow through the conduit entrance 56 to the control box and then, from the control box 50 to the small conduit 52 or through a conventional expansion valve to the large conduit 54. The control means 50 will be suitably controlled in any suitable manner by the operator, depending upon what is needed, or may be preset to operate at a particular time or under a particular condition. Details of such mechanism being quite conventional, no attempt is made here to disclose such details.

In operation, this device may be mounted either singly or as many as needed, on either a space craft or an aircraft, or other vehicle whose outer shell is subject to a suitable external pressure, and before starting the journey, the chamber 48 is filled with a gas under pressure, such gas being compressed air or compressed ammonia or Freon or other suitable gas or fluid, depending on the use to which it is to be put. At extremely high speed, or on entering the atmosphere, an aircraft or space craft would be subject to friction of the atmosphere, and this tends to cause dangerous heating. One purpose of this invention is to provide cooling means, as when the device is mounted on a missile as it re-enters the atmosphere. In such case, the control 50 will be set to conduct the fluid from the chamber 48 through the pipe entry 56 to the large diameter conduit 54 coiled about within the cylinder wall 12. In this case, the cooling gas has been previously inserted under high compression so as to be in liquid state within the chamber 48, and the valve control 50 is, of course, closed but set to open when the temperature of the cylindrical wall 12 reaches a predetermined temperature. When this happens, the control 50 permits the cooling fluid to pass from the chamber 48 through the conduit entrance 56 to control 50 and thence, to the large diameter conduit 54, expanding as it passes into this large diameter conduit and providing a cooling medium coiled about the inner wall of the cylindrical wall 12 for maintaining the wall at a safe temperature until the missile has slowed down—to a temperature at which the friction no longer makes the heat excessive.

As the carrier enters the atmosphere, the nose cone 30 is subjected to the pressure of the atmosphere, and as the fluid flows out of the chamber 48, the nose cone 30 causes the piston 24 to move within the chamber 48 from the position shown in FIG. 1 toward the position shown in FIG. 2, thus maintaining the compression of the fluid in chamber 48 for a sufficient time as needed for the purpose. The small diameter conduit 52 will lead to a location where power pressure may be needed for conducting pressure to places where pressure control may be needed, for some of the uses might be to change direction by jetting out from suitable locations, or to extend retractible wings, or to cushion landings of the device on this or other planets. Obviously, many other uses may be made.

When used as a power source, the fluid in chamber 48 flows directly from the conduit entrance 56 through control 50 to small diameter conduit 52 without being permitted to expand and, with the pressure of the nose cone maintaining pressure on the fluid supply in the chamber 48, the pressure delivered at the desired location is substantially unchanged, and is thus available for other power needs that there may be.

Obviously, if it is known ahead of time whether cooling would be the particular use of the device, or power would be the particular use of the device, the appropriate gas will be placed in the chamber 48, Freon or similar cooling gas when it is intended to be used only for cooling, or, compressed air, nitrogen or other inert gas when it is intended to be used only as a pressure source of power. When the location is such that it might be necessary to use it for either purpose without knowing ahead of time which purpose it may be used for, then obviously, a compressed cooling gas such as Freon may be stored under pressure in the chamber 48 and the control 50 when leading it through the expansion valve therein will lead it through the large diameter conduit 54 for cooling purposes. On the other hand, should power be needed rather than cooling, then the control 50 would be manipulated to by-pass the expansion valve and lead it directly to the small diameter conduit 52 to the desired location where power is needed.

Obviously, one or several of these devices may be provided on the aircraft or the space craft, and may be provided with fluid particularly intended for one purpose or the other purpose or, if necessary, in some cases, for either purpose. It can be used only for one purpose at one time and obviously, the cooling conduit 54 may serve not only to cool the cylindrical wall, but may be conducted elsewhere in the space craft or aircraft to provide cooling to other walls of the craft, as needed.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A device for delivering compressed fluid under pressure comprising a nose driven piston and compression chamber comprising a cylindrical wall, a floor in the rear end of said cylinder wall providing a chamber, a piston movable within said chamber toward said rear floor, an internally flanged lip at the front end of said cylinder wall limiting the forward movement of said piston, a conical nose, support means on said piston securing said conical nose thereto, said chamber being arranged to contain a supply of fluid under pressure between said chamber floor and said piston, conduit means extending through said floor, said conduit means being coiled internally about said cylindrical wall below said floor, and control means for said conduit means for controlling the flow of fluid from said chamber, said nose, when subjected to pressure, driving said piston to exert pressure on said fluid when said controls are operated to cause fluid to flow to said conduit means.

2. The device of claim 1, said nose cone projecting over the cylinder wall to limit the movement of said piston toward said cylinder rear floor.

3. The device of claim 1, said conduit means comprising a large diameter conduit and a small diameter conduit.

4. The device of claim 3, said large diameter conduit being used for conducting cooling gas expanding from said compressed fluid through said fluid flow control means to cool said cylindrical wall.

5. The device of claim 3, said small diameter conduit being used for conducting compressed fluids to a power use location.

References Cited in the file of this patent
UNITED STATES PATENTS

| | | |
|---|---|---|
| 1,426,907 | Ramsey | Aug. 22, 1922 |
| 2,617,359 | Van Horn et al. | Nov. 11, 1952 |
| 3,030,772 | Drake | Apr. 24, 1962 |

FOREIGN PATENTS

| | | |
|---|---|---|
| 502,762 | France | Feb. 27, 1920 |